United States Patent

[11] 3,540,780

| [72] | Inventors | Atutosi Okamoto<br>Toyohashi-shi;<br>Koichi Taniguchi, Kariya-shi; Yoshiaki Nakano, Gifu-shi, Japan |
|---|---|---|
| [21] | Appl. No. | 713,772 |
| [22] | Filed | March 18, 1968 |
| [45] | Patented | Nov. 17, 1970 |
| [73] | Assignee | Nippon Denso Company Limited<br>Kariya-shi, Japan<br>a corporation of Japan |
| [32] | Priority | Aug. 31, 1967 |
| [33] | | Japan |
| [31] | | Nos. 42/56005 and 42/56007 |

[54] ANTISKID APPARATUS FOR AUTOMOTIVE VEHICLES
2 Claims, 10 Drawing Figs.

[52] U.S. Cl................................................. 303/21,
    303/20
[51] Int. Cl.................................................. B60t 8/08
[50] Field of Search.......................................... 303/20,
    21A4, BE, BB, CE

[56] References Cited
UNITED STATES PATENTS

| 3,026,148 | 3/1962 | Ruof | 303/21(BE)UX |
| 3,301,608 | 1/1967 | Harned et al. | 303/21(A4)UX |
| 3,401,984 | 9/1968 | Williams et al. | 303/21(A4)UX |
| 3,441,320 | 4/1969 | Flory | 303/21(BB)UX |

*Primary Examiner*—Duane A. Reger
*Attorney*—Cushman, Darby & Cushman

ABSTRACT: An antiskid apparatus for an automotive vehicle, which comprises brake force control means adapted to control the brake force in three stages, that is, a high brake force stage, a medium brake force stage and a low brake force stage, and operative in such a way that on a nonslippery road surface the brake force is shifted from the high brake force stage to the medium brake force stage or vice versa upon variation in the brake system operating hydraulic pressure in accordance with a signal from vehicle speed detecting means, while on a slippery road surface the brake force is shifted from the high brake force stage to the low brake force stage or vice versa upon variation in the brake system operating hydraulic pressure in accordance with a signal from said vehicle speed detecting means.

INVENTORS
ATUTOSI OKAMOTO
KOICHI TANIGUCHI
YOSHIAKI NAKANO
BY
Cushman, Darby & Cushman

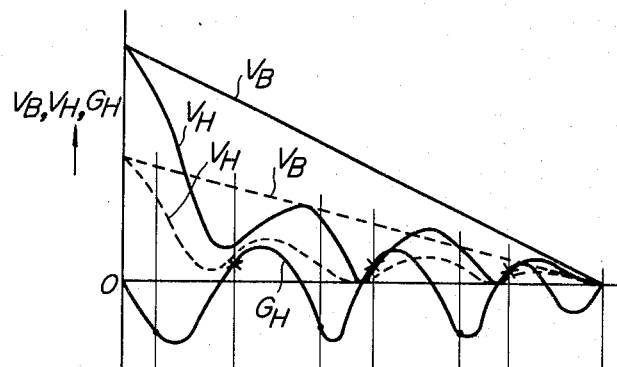
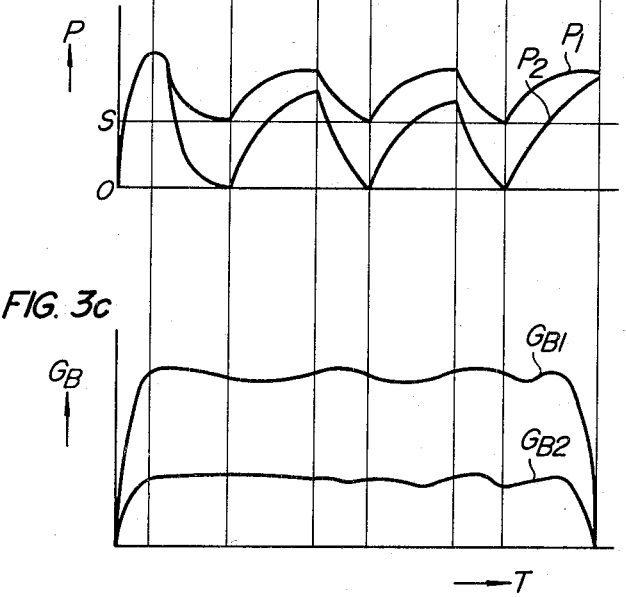

ANTISKID APPARATUS FOR AUTOMOTIVE VEHICLES

BACKGROUND OF THE INVENTION

1. Field Of The Invention

The present invention relates to an antiskid apparatus for an automotive vehicle, which is especially useful to prevent a gyrating movement of the vehicle body or a loss of steerability of the vehicle due to the locked state of the wheels resulting from the impartation of a brake force to the automotive vehicle which is running on a slippery road surface or running at high speed.

2. Description of the Prior Art

The prior art antiskid apparatus was operative to detect the deceleration and acceleration of the wheels to thereby merely effect the on-off control of the brake force. For example, the prior art antiskid apparatus was so designed that, when the wheels were braked to run with a deceleration less than a predetermined setting due to the impartation of a brake force to the vehicle, the apparatus was actuated to release the brake force to thereby allow the wheels to run at an increased speed, and when the acceleration exceeded a predetermined setting, the apparatus was operative to impart a brake force to the vehicle again. However, the prior art apparatus of the kind which was adapted to merely effect an on–off control of the brake force in two stages, that is, a stage of high brake force and a stage of low brake force, has given rise to such objectionable problem that the brake force is released more than is required on a nonslippery road surface, and as a result, excessive and quickly repeated fluctuation takes place in the rotation of the wheels so that the speed of response of the antiskid action cannot properly follow the variation in the speed of the wheels. In view of the above situation, an attempt to provide a brake force control means which can properly follow up the rate of variation in the speed of the wheels has resulted in the requirement for the provision of a power source which can deliver a power as high as several horsepowers. Thus, the attainment of such a high speed response as described above has been utterly impracticable with a brake force control means of the vacuum type utilizing the negative pressure of the engine or with a brake force control means of the electrically driven type employing an electric motor which is adapted to receive its drive power from the battery mounted on the vehicle.

The brake force control means of the vacuum-type or of the electrically driven type, when adapted to operate by detecting the deceleration or acceleration of the wheels, has also been defective in that the speed of response of the antiskid action cannot properly follow the rate of variation in the speed of the wheels when the vehicle is running on a nonslippery road surface, and the deceleration of the vehicle body during the braking operation varies usually very much between 0 to 1 g. (g. being the acceleration of gravity) in the order of 2 cycles per second, with the result that a long braking distance is required to stop the vehicle and a very uncomfortable feeding of ride is unavoidable during the impartation of the brake force to the vehicle. Further, with the conventional apparatus of the type in which the brake force is controlled in two stages consisting of a stage of a high brake force and a stage of a low brake force, the intermittent locking state of the wheels lasts undesirably long, although such intermittent locking of the wheels is unavoidable when the antiskid operation is put in effect on a slippery road surface.

Moreover, when the vehicle runs on a particularly slippery road surface such as a frozen road surface, there has frequently been the danger that the vehicle skids over the frozen road surface with its wheels kept in their locked state because the wheels may prematurely be urged to their locked state depending on the degree of actuation of the brake pedal without the speed of the wheels being reduced to a value less than a predetermined setting, and the brake force thus imparted is not released at all once the wheels have been locked in the above manner.

SUMMARY OF THE INVENTION

In order to eliminate the prior defects described above, it is the primary object of the present invention to provide an antiskid apparatus for an automotive vehicle which is operative to prevent the wheels from being continuously locked when the vehicle runs on a slippery road surface and to minimize the change in the deceleration of the vehicle body while maintaining a constant brake force even in the brake force released state when the vehicle runs on a nonslippery road surface which brings about a large deceleration of the vehicle body, thereby giving a comfortable feeling of ride during the impartation of the brake force to the vehicle and shortening the braking distance to stop the vehicle. In order to attain the above object, the present invention contemplates the provision of an antiskid apparatus which comprises means for controlling the brake force in three different stages, that is, a high brake force stage, a medium brake force stage and a low brake force stage, said brake force control means being operative in such a way that a transition from the high brake force stage to the medium brake force stage takes place when the deceleration of the vehicle body exceeds a predetermined setting and the deceleration of the wheels exceeds a predetermined setting and a transition from the medium brake force stage back to the high brake force stage takes place when the deceleration of the vehicle body exceeds a predetermined setting and the acceleration of the wheels exceeds a predetermined setting, while a transition from the high brake force stage to the low brake force stage takes place when the deceleration of the vehicle body is below the predetermined setting and a transition from the low brake force stage back to the high brake force stage takes place when the deceleration of the vehicle body is below the predetermined setting and the acceleration of the wheels exceeds the predetermined setting.

Another object of the present invention is to provide an antiskid apparatus for an automotive vehicle which is operative to positively prevent the wheels from being continuously locked and shorten the period of intermittent locking state of the wheels remarkably when the vehicle runs on a slippery road surface, and to maintain the deceleration of the vehicle body substantially constant when a brake force is imparted to the vehicle running on a nonslippery road surface, for thereby shortening the braking distance and giving a comfortable feeling of ride during the impartation of the brake force to the vehicle. In order to attain the above object, the antiskid apparatus of this invention comprises means for controlling the brake force in three different stages, that is, a high brake force stage, a medium brake force stage and a low brake force stage, means for deriving a voltage $V_H$ representing the speed of the wheels and means for deriving a voltage $V_B$ representing the speed of the vehicle body, said brake force control means being operative in such a way that a transition from the high brake force stage to the medium brake force stage takes place when the voltage $V_H$ during the braking operation is lower than a voltage $\beta_1$ times the voltage $V_B$ or a voltage $\beta_1 V_B$ and a transition from the medium brake force stage back to the high brake force stage takes place when the voltage $V_H$ exceeds said voltage $\beta_1 V_B$, while a transition from the medium brake force stage to the low brake force stage takes place when the voltage $V_H$ is lower than a voltage $\beta_2$ times the voltage $V_B$ or a voltage $\beta_2 V_B$ wherein $\beta_2$ is smaller than $\beta_1$, and a transition from the low brake force stage back to the medium brake force stage takes place when the voltage $V_H$ exceeds said voltage $\beta_2 V_B$.

BRIEF DESCRIPTION OF THE DRAWINGS

FIGS. 3a, 3b and 3c are graphic representations for the explanation of the antiskid operation of the antiskid apparatus of this invention, wherein FIG. 3a shows the relation between the vehicle speed, wheel speed and wheel deceleration, and the braking time; FIG. 3b shows the relation between the hydraulic pressure in the wheel cylinder and the braking time; and FIG. 3c shows the relation between the deceleration of the vehicle body and the braking time.

FIGS. 5a, 5b, 5c and 5d are graphic representations for the explanation of the antiskid operation of the antiskid apparatus of this invention, wherein FIGS. 5a and 5b show the relation between the voltage representing the speed of the vehicle body and the braking time; FIG. 5c shows the relation between the hydraulic pressure in the wheel cylinder and the braking time, and FIG. 5d shows the relation between the deceleration of the vehicle body and the braking time.

DESCRIPTION OF THE PREFERRED EMBODIMENTS

Figure 1:
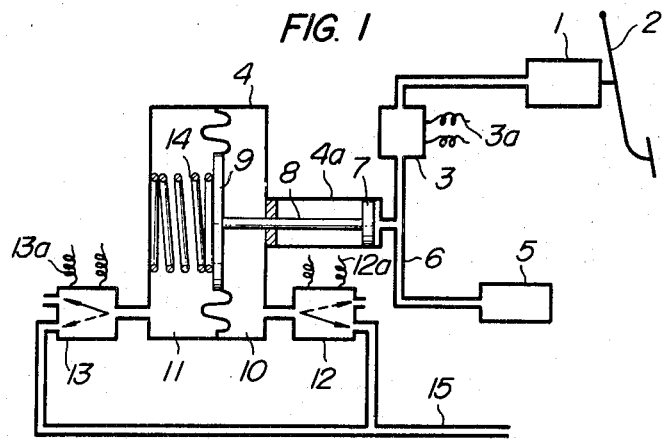
FIG. 1 is a diagrammatic view showing an embodiment of the structure of the antiskid apparatus according to the present invention equipped with a brake force control device.
Figure 2:
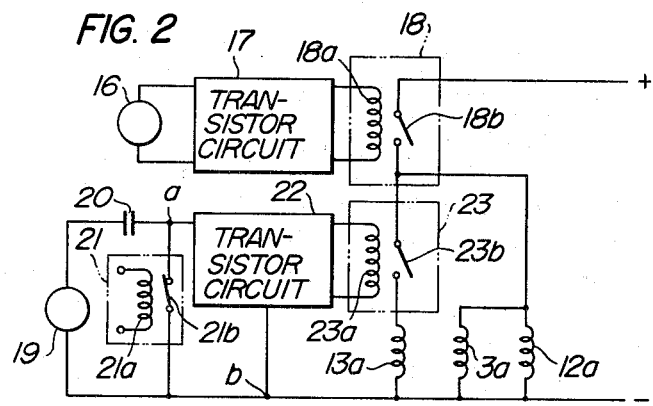
FIG. 2 is an electrical connection diagram of an embodiment of the electrical control section in the brake force control device shown in FIG. 1.

An embodiment of the antiskid apparatus according to this invention will be described with reference to FIGS. 1 to 3. Referring to FIGS. 1 and 2, a master cylinder 1 in the brake system in an automotive vehicle is connected with a brake pedal 2 so as to control the hydraulic pressure in the brake system. The antiskid apparatus comprises a solenoid-operated shutoff valve 3 which is disposed in a hydraulic fluid conduit 6 connecting the master cylinder 1 with a brake force controller 4 and a wheel cylinder 5, and acts to shut off the hydraulic fluid supply to the brake force controller 4 and the wheel cylinder 5 when the brake force is released during the antiskid operation. The brake force controller 4 is equipped with a hydraulic cylinder 4a in which a piston 7 is slidably received so as to cause a variation in hydraulic pressure in the wheel cylinder 5. A connecting rod 8 mechanically connects the piston 7 with a diaphragm 9 disposed in the brake force controller 4 and acts to transmit a force exerted on the diaphragm 9 to the piston 7. The diaphragm 9 divides the interior of the brake force controller 4 into two air chambers 10 and 11 with which respective solenoid-operated changeover valves 12 and 13 are connected so that a negative pressure developed by the intake of air into the engine and the atmospheric pressure can be selectively introduced into these air chambers 10 and 11. A coil spring 14 is disposed in the air chamber 11 for normally urging the diaphragm 9 toward the air chamber 10. For example, the coil spring 14 is so designed as to urge the diaphragm 9 to thereby normally set the hydraulic pressure in the wheel cylinder 5 at 20 kilograms per square centimeter. The solenoid-operated changeover valve 12 is operative in such a way as to establish communication between the air chamber 10 and a negative pressure-detecting section for the engine (not shown) in the deenergized state of the solenoid 12a while interrupting communication between the air chamber 10 and the atmosphere, and to interrupt communication between the air chamber 10 and the negative pressure-detecting section for the engine in the energized stage of the solenoid 12a while establishing communication between the air chamber 10 and the atmosphere. On the other hand, the solenoid-operated changeover valve 13 is operative in such a manner as to interrupt communication between the air chamber 11 and the negative pressure detecting section for the engine in the deenergized state of solenoid 13a while establishing communication between the air chamber 11 and the atmosphere, and to establish communication between the air chamber 11 and the negative pressure-detecting section for the engine in the energized state of the solenoid 13a while interrupting communication between the air chamber 11 and the atmosphere. A negative pressure supply conduit 15 is provided to connect the engine negative pressure-detecting section with the air chambers 10 and 11. In the electric circuit of the brake force controller there is provided a detector 16 for detecting the deceleration and acceleration of the wheels, which detector is designed to operate so as to differentiate the direct current output voltage of, for instance, a generator connected to the wheels and thereby to obtain the deceleration or acceleration of the wheels. There is also provided a transistor circuit 17 which is adapted to detect a predetermined voltage level as is the Schmitt circuit and, when the deceleration of the wheels exceeds a predetermined setting, say 2.5 g., energizes a relay coil 18a of a relay 18 to close the relay contacts 18b and maintain said relay contacts in the closed position, whereas when the acceleration is produced in the wheels and the value of said acceleration exceeds a predetermined setting, say 0.5 g., deenergizes the relay coil 18a of the relay 18 to bring the relay contacts 18b from a closed position to an open position. In order to achieve the above-described function, the transistor circuit 17 may be composed of a Schmitt circuit to detect, for instance, the deceleration of the wheels at the predetermined setting, a silicon control rectifier for receiving a gate pulse from said Schmitt circuit to maintain said relay contacts 18b in the closed position and means to interrupt said silicon control rectifier when a predetermined acceleration is developed in the wheels. In the circuit is also provided a vehicle body deceleration detector 19 which may, for example, be a differential transformer, a weight or a spring. A condenser 20 and a relay 21 are provided to eliminate the gravitational influence brought about the inclination of the road surface from a true vehicle body deceleration resulting from the brake force. Namely, on an inclined road surface, an output voltage occurs in the differential transformer as a result of the displacement of the ferrite rod of said differential transformer, despite the fact that the vehicle body is not actually decelerated. Such output voltage is prevented from being imposed on the vehicle body deceleration by the operation of the condenser 20 and the relay 21. The relay 21 is arranged for operation in an interlocked relation with the brake pedal 2 so that the actuation of the brake pedal 2 energizes the relay coil 21a to thereby urge the relay contacts 21b to open. A transistor circuit 22 is composed of an element, e.g. FET transistor, which is adapted to amplify an input impedance of a circuit, such as a Schmitt circuit, which is adapted to detect a predetermined voltage level. This transistor circuit 22 is provided to prevent the charge stored in the condenser 20 from discharging and is operative to urge relay contacts 23b of a relay 23 to close by energizing a relay coil 23a when the deceleration of the vehicle body is below a definite value, say 0.4 g., and urge said relay contacts to open when the deceleration of the vehicle body exceeds 0.4 g.,The relay contacts 18b of the relay 18 have the solenoid 3a of the solenoid-operated shutoff valve 3 and the solenoid 12a of the solenoid-operated changeover valve 12 connected thereto respectively. The relay contacts 23b of the relay 23 have the solenoid 13a of the solenoid-operated changeover valve 13 connected thereto.

The antiskid apparatus having a structure as described above operates in the manner described below. When the brake pedal 2 is actuated to impart a brake force to the running vehicle, the relay contacts 21b of the relay 21 are urged to open so that the condenser 20 is now connected in series with the vehicle body deceleration detector 19 from the previous parallel connection therewith. Accordingly, at such a moment, the output voltage of the electrical circuit consisting of the vehicle body deceleration detector 19 and the condenser 20, that is, the voltage appearing across the input terminals a and b of the transistor circuit 22 becomes necessarily zero, and thereafter a voltage representing the deceleration of the vehicle body is supplied from the vehicle body deceleration detector 19 to appear across the input terminals a and b of the transistor circuit 22 through the condenser 20. The charging voltage for the condenser 20 is of course maintained substantially constant when the relay contacts 21b are open. On the other hand, the output of the transistor circuit 17 holds the solenoids 12a and 13a of the respective solenoid-operated changeover valves 12 and 13, associated with the brake force controller 4, in their deenergized state. Under such a state, the negative pressure appears in the air chamber 10 and the atmospheric pressure in the air chamber 11, with the result that the piston 7 is urged to the right-hand extremity of the cylinder 4a by the diaphragm 9 as shown in FIG. 1. When the hydraulic pressure in the wheel cylinder 5 increases to cause deceleration of the wheels and the deceleration value exceeds a predetermined setting, say 2.5 g., the transistor circuit 17 closes the relay contacts 18b of the relay 18. By the closure of the relay contacts 18b, the solenoids 3a and 12a of the solenoid-operated shutoff valve 3 and the solenoid-operated changeover valve 12 are energized, with the result that the solenoid-operated shutoff valve 3 shuts off the hydraulic fluid supply through the hydraulic fluid supply through the hydraulic fluid supply conduit extending from the master cylinder 1 to the brake force controller 4 and the wheel cylinder 5, and at the same time, the atmospheric pressure appears in the air chamber 10. If, in this case, the road surface is hardly slippery and the vehicle body deceleration exceeds a predetermined setting, say 0.4 g., the solenoid 13a of the solenoid-operated changeover valve 13 is not energized, so that the atmospheric pressure continues to appear in the air chamber 11 and the hydraulic pressure in the wheel cylinder 5 drops to a predetermined level which is determined by the coil spring 14. In this case, the hydraulic pressure level is so selected as not to lock the wheels on a nonslippery road surface on which the vehicle body deceleration becomes higher than 0.4 g. Therefore, by lowering the hydraulic pressure in the wheel cylinder 5 to the predetermined level, the wheels begin to accelerate. When the acceleration of the wheels reaches a predetermined setting, say 0.5 g. or higher, the relay contacts 18b of the relay 18 are shifted from the closed state to the open state by the functioning of the transistor circuit 17, with the result that a negative pressure appears in the air chamber 10 and the atmospheric pressure in the air chamber 11. Thus, the hydraulic pressure in the wheel cylinder 5 is increased again and the speed of the wheels is reduced. Thereafter, the above-described antiskid operation is repeated until the vehicle is finally brought to a halt.

Now, when the vehicle body deceleration is below 0.4 g. on a slippery road surface at the point when the wheel deceleration exceeds 2.5 g. and the relay contacts 18b of the relay 18 are closed, the relay contacts 23b of the relay 23 are brought into a closed position by the transistor circuit 22, and thus the solenoids 12a and 13a of the respective solenoid-operated changeover valves 12 and 13 are energized. Therefore, a negative pressure appears in the air chamber 11 with the diaphragm 9 compressing the coil spring 14 and this movement of the diaphragm 9 causes the piston 7 to proceed to the left-hand extremity of the cylinder 4a for thereby reducing the hydraulic pressure in the wheel cylinder 5 to substantially zero.

As the hydraulic pressure in the wheel cylinder 5 is reduced in the manner described, the speed of the wheels begins to increase and, when the wheel acceleration reaches a value higher than 0.5 g., the relay contacts 18b of the relay 18 are opened by the transistor circuit 17 and thus the solenoids 3a and 12a of the solenoid-operated shutoff valve 3 and the solenoid-operated changeover valve 12 are deenergized. As a result, the hydraulic pressure in the wheel cylinder 5 is increased again decelerating the wheels. When the deceleration of the wheels exceeds 2.5 g., the solenoids 3a and 12a of the solenoid-operated shutoff valve 3 and the solenoid-operated changeover valve 12 are energized and thus the hydraulic pressure in the wheel cylinder 5 again drops to substantially zero. Thereafter, the above-described antiskid operation is repeated and thereby the automotive vehicle running in a slippery road surface is braked.

FIG. 3 shows graphically the antiskid operation when a vehicle is controlled by the antiskid apparatus according to the present invention. The abscissa in each of FIGS. 3a, 3b and 3c represents the braking time T, while the ordinate in FIG. 3a represents the vehicle speed $V_B$, the wheel speed $V_H$ and the wheel deceleration and acceleration $G_H$ respectively. In the drawings, the point mark indicates the point of wheel deceleration of 2.5 g. and the crossmark indicates the point of wheel acceleration of 0.5 g. The speed of the vehicle body $V_B$ and the speed of the wheels $V_H$ on a nonslippery road surface are represented by the solid lines and those on a slippery road surface are represented by the broken lines. The deceleration or acceleration of the wheels are substantially the same in either case.

In FIG. 3b, the ordinate represents the hydraulic pressure P in the wheel cylinder 5. The straight line S represents a definite hydraulic pressure which is determined by the force of the coil spring 14. The curve $P_1$ indicates the hydraulic pressure response on a nonslippery road surface and the curve $P_2$ the hydraulic pressure response on a slippery road surface. In FIG. 3c, the ordinate represents the vehicle body deceleration $G_H$. The curve $G_{H1}$ indicates the vehicle body deceleration on a nonslippery road surface and the curve $G_{H2}$ indicates the same on a slippery road surface. At any rate, FIG. 3 shows the antiskid operation in the event when the speed $V_B$ of the vehicle immediately before effecting the braking operation on a slippery road surface is about one half of that on a nonslippery road. As will be seen from FIG. 3 described above, the hydraulic pressure, when the vehicle is running on a non-slippery road surface, is not reduced to zero, even in the hydraulic pressure released state, but a certain amount of hydraulic pressure S remains in the wheel cylinder. Therefore, no significant change occurs in the deceleration $G_H$ of the vehicle body but the vehicle body is braked at a substantially constant deceleration. As a result, the vehicle equipped with the antiskid apparatus provides a comfortable feeling of ride and can be stopped at a shortened braking distance compared with vehicles equipped with prior art antiskid apparatus. Further, since the hydraulic pressure is released to substantially zero on a slippery road surface, the wheels are held in a locked state for a very short period of time or just momentarily.

In the foregoing, description has been given with particular reference to the antiskid operation when the apparatus of the present invention is adapted to cooperate with a hydraulic brake system, but it will be readily understood that the invention is equally effectively applicable to brake systems employing compressed air or vacuum for the braking operation.

It will be appreciated from the foregoing description that the antiskid apparatus for an automotive vehicle according to the present invention described in the embodiment above exhibits such a marked effect that, on a nonslippery road surface causing a large deceleration of the vehicle body, the brake force is not rendered zero but a predetermined brake force of such an extent as will not lock the wheels is left even in the released state of the brake force in order to minimize the variation in the vehicle body deceleration. Such a marked effect can be obtained by virtue of the fact that the antiskid apparatus comprises the brake force control device which controls the brake force in three stages, that is, a high brake force stage, a medium brake force stage and a low brake force stage, and which is operative in such a manner that a transition from the high brake force stage to the medium brake force stage takes place when the deceleration of the vehicle body exceeds a predetermined setting an the deceleration of the wheel is higher than a predetermined setting, and a transition from the medium brake force stage back to the high brake force stage takes place when the deceleration of the vehicle body is higher than a predetermined setting and the acceleration of the wheels is higher than a predetermined setting, while a transition from the high brake force stage to the low brake force stage takes place when the deceleration of the vehicle body is lower than the predetermined setting and the deceleration of the wheels exceeds the predetermined setting, and a transition from the low brake force stage back to the high brake force stage takes place when the deceleration of the vehicle body is lower than the predetermined setting and the acceleration of the wheels exceeds the predetermined setting. The manner of operation on a nonslippery road surface in which the brake force is not rendered zero but a predetermined brake force of such an extent as will not lock the wheel is left even in the released state of the brake force, is effective to retard the rate of variation in the rotation of the wheels during the antiskid operation. Therefore, the brake force control device needs not have an excessively high speed of response and can be sufficiently actuated by a power source such as the negative pressure of the engine or the battery mounted on the vehicle to satisfactorily control the antiskid operation. Further, on a slippery road surface on which a small vehicle body deceleration can only be developed, the brake force is shifted from the high brake force stage to the low brake force stage and thereby the brake force is reduced to substantially zero. Thus, the present invention provides another excellent effect so that the wheels are held in a locked state only momentarily and a stable antiskid operation can be obtained.

Figure 4:
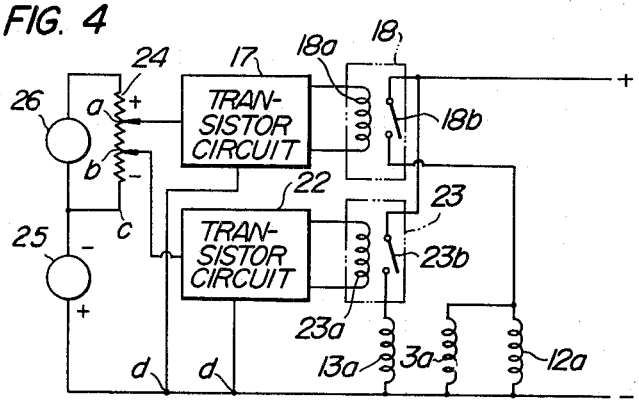
FIG. 4 is an electrical connection diagram of another embodiment of the electrical control section in the brake force control device shown in FIG. 1.
Figure 5A:
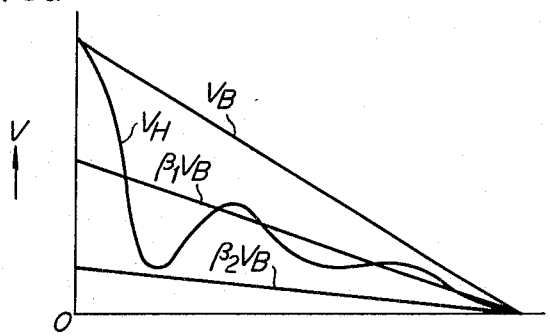
Figure 5B:
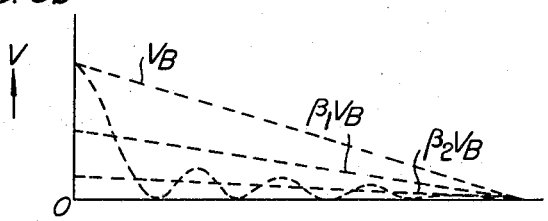
Figure 5C:
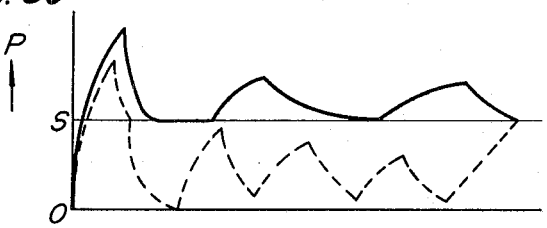
Figure 5D:
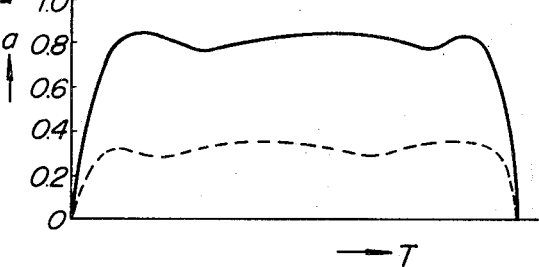

Another embodiment of the antiskid apparatus according to this invention will be described with reference to FIGS. 1 and 4. In this embodiment, the apparatus is provided with a vehicle body speed detector 26 for indicating the vehicle body speed in terms of direct current voltage. The vehicle body speed may be detected, for instance, by connecting a generator to a wheel which is mounted on the vehicle body to be rotated independently of the operation of the brake system. A voltage dividing resistor 24 is connected to both terminals of the vehicle body speed detector 26 in parallel thereto, so that a voltage $\beta_1 V_H$ which is $\beta_1$ times the voltage $V_H$ obtained from the vehicle body speed detector 26 representing the vehicle body speed, appears across the terminals $a$ and $c$ of said resistor. An arrangement is also made so that a voltage $\beta_2 V_H$ which is a voltage $\beta_2$ times the voltage $V_H$ representing the vehicle body speed, appears across the terminals $b$ and $c$. In this case, both of $\beta_1$ and $\beta_2$ are greater than zero but smaller than 1, and $\beta_1$ is greater than $\beta_2$. However, $\beta_2$ may be set at zero depending upon the construction of the circuit. A wheel speed detector 25 is also provided to indicate the speed of the wheel in the form of direct current voltage. This wheel speed detector 25 is connected in series with the vehicle body speed detector 26 in such a manner that the polarities of the output voltages from the respective detectors are opposite to each other. A transistor circuit 17 is provided to actuate a relay 18 upon discriminating the positive or negative value of an input voltage across its input terminals $a$ and $d$. Namely, the transistor circuit 17 energizes a relay coil 18$a$ of the relay 18 to close the relay contacts 18$b$ when a voltage $V_H$ from the wheel speed detector 25 representing the speed of the wheels is smaller than the aforesaid voltage $\beta_1 V_H$ and the aforesaid input voltage is positive, and deenergizes the relay coil 18$a$ of the relay 18 to open the relay contacts 18$b$ when the input voltage is negative. In the circuit is provided another transistor circuit 22 which operates in the same manner as the transistor circuit 17. Namely, the transistor circuit 22 is operative in such a way that it energizes a relay coil 23$a$ of a relay 23 to close the relay contacts 23$b$ when the voltage $V_H$ representing the wheel speed is smaller than a voltage $\beta_2 V_H$ which is $\beta_2$ times the voltage $V_H$ representing the vehicle body speed and the input voltage across the input terminals $b$ and $d$ is positive, whereas it deenergizes the relay coil 23$a$ of the relay 23 to open the relay contacts 23$b$ when said input voltage is negative. The transistor circuits 17 and 22 may, for instance, be a Schmitt circuit. The relay contacts 18$b$ of the relay 18 have connected thereto a solenoid 3$a$ of a solenoid-operated shutoff valve 3 and a solenoid 12$a$ of a solenoid-operated changeover valve 12, while the relay contacts 23$b$ of the relay 23 have connected thereto a solenoid 13$a$ of a solenoid-operated changeover valve 13.

The apparatus of this embodiment constructed as described above will operate in the following manner. When a brake pedal 2 is actuated to brake the running automotive vehicle, the hydraulic pressure in a master cylinder 1 is elevated. In this case, since the solenoids 12$a$ and 13$a$ of the respective solenoid-operated changeover valves 12 and 13 in the brake force control device 4 are all in their deenergized state, a negative pressure appears in the air chamber 10 and the atmospheric pressure in the air chamber 11, and the piston 7 is urged to the right-hand extremity of the cylinder 4. Therefore, the hydraulic pressure in the wheel cylinder 5 increases. When the hydraulic pressure in the wheel cylinder 5 increases in the manner described, the speed of the wheels drops, with the accompanying result that the voltage $V_H$ representing the wheel speed becomes lower than the voltage $\beta_1 V_H$ which is $\beta_1$ times the voltage $V_H$ representing the vehicle body speed. The transistor circuit 17, therefore, energizes the relay coil 18$a$ of the relay 18 to thereby close the relay contacts 18$b$ of said relay. By the closure of the relay contacts 18$b$, the solenoids 3$a$ and 12$a$ of the respective solenoid-operated shutoff valve 3 and the solenoid-operated changeover valve 12 are energized, with the result that the hydraulic pressure circuit between the master cylinder 1 and the brake force controller 4, and the wheel cylinder 5, is shut off, and at the same time, both of the air chambers 10 and 11 of the brake force controller 4 are communicated with the atmosphere. As a result, the hydraulic pressure in the wheel cylinder 5 drops to a level which is determined by the force of the coil spring 14. Here, the hydraulic pressure to be determined by the force of the coil spring 14 is so set that the wheels will not lock on a relatively nonslippery road surface such as the surface of a dry asphalt-paved road or an unpaved road. On such a road surface, the hydraulic pressure in the wheel cylinder 4 is allowed to drop to a definite level as determined by the coil spring 14 and thereby the wheels are accelerated again with the voltage $V_H$ representing an increase of the speed of the wheels. When the voltage $V_H$ exceeds the voltage $\beta_1 V_H$, the relay contacts 18$b$ of the relay 18 are opened by the transistor circuit 17 to deenergize the solenoids 3$a$ and 12$a$ of the solenoid-operated shutoff valve 3 and the solenoid-operated changeover valve 12, so that the hydraulic pressure in the wheel cylinder 5 increases to reduce the wheel speed. Thereafter, the above-described antiskid operation is repeated and thus the vehicle running on a hardly slippery road surface is braked to stop.

Now, the operation of the antiskid apparatus of this embodiment in the event when the vehicle is running on a slippery road surface, such as a frozen road surface, will be explained hereunder. When the brake pedal 2 is actuated with the vehicle running on a slippery road surface, hydraulic pressure in the master cylinder 1 is built up, and as consequence the voltage $V_H$ representing the speed of the wheels becomes lower than the voltage $\beta_1 V_H$ which is $\beta_1$ times the voltage representing the speed of the vehicle body. Therefore, the solenoids 3$a$ and 12$a$ of the solenoid-operated shutoff valve 3 and the solenoid-operated changeover valve 12 are energized as described previously, causing the hydraulic pressure in the wheel cylinder 5 to drop to the level determined by the force of the coil spring 14. On a slippery road surface, however, the rotation of the wheels does not increase even with such a hydraulic pressure but continues to approach the locked state. Therefore, when the wheel speed drops further and the voltage $V_H$ becomes lower than the voltage $\beta_2 V_H$ which is $\beta_2$ times the voltage representing the vehicle body speed, the relay contacts 23$b$ of the relay 23 are closed by the function of the transistor circuit 22, causing energization of the solenoid 13$a$ of the solenoid-operated changeover valve 13. As a result, the atmospheric pressure appears in the air chamber 10 and a negative pressure in the air chamber 11 of the brake force controller 4, whereby the diaphragm 9 is moved to compress the coil spring 14 as a result of which the hydraulic pressure in the wheel cylinder 5 is reduced to substantially zero.

When a drop of hydraulic pressure occurs in the wheel cylinder 5, the speed of the wheel increases again, and when the voltage $V_H$ representing the wheel speed becomes greater than the voltage $\beta_2 V_H$, the solenoid 13$a$ of the solenoid-operated changeover valve 13 is held in the deenergized state. Thus, both the air chambers 10 and 11 communicate with the atmosphere and the hydraulic pressure in the wheel cylinder 5 is built up by virtue of the coil spring 14, and accordingly the wheel speed begins to drop again. Thereafter, the above-described antiskid operation is repeated to brake the vehicle running on a slippery road surface.

FIG. 5 shows graphically the antiskid operation when a vehicle is controlled by this embodiment of the antiskid apparatus according to the present invention. The abscissa in each of FIGS. 5a, 5b, 5c and 5d represents the braking time T, while the ordinates in FIGS. 5a and 5b represent the speed representative voltage V, the ordinate in FIG. 5c represents the hydraulic pressure P in the wheel cylinder, and the ordinate in FIG. 5d represents the vehicle body deceleration $a$. A line S in FIG. 5c represents a predetermined hydraulic pressure which is determined by the force of the coil spring 14. In FIG. 5, the solid curves indicate the antiskid operation on a nonslippery road surface, while the broken lines indicate the antiskid operation on a slippery road surface. As shown in FIG. 5b, the vehicle body speed immediately before the braking operation on a slippery road surface is about one-half of that on a nonslippery road surface. It will be understood from FIG. 5 that, on a nonslippery road surface, an appreciably large variation does not take place in the vehicle body deceleration $a$ and the breakage is effected with a substantially constant deceleration, although the wheels are rotating fully. As a result, the vehicle equipped with this embodiment of the antiskid apparatus according to the present invention provides a comfortable feeling of ride and can be stopped at a shortened braking distance compared with vehicles equipped with prior art antiskid apparatus. Further, the antiskid apparatus of this invention provides the advantage that even on a slippery road surface, the variation in vehicle body speed is extremely small and the period of intermittent locking of the wheels is extremely short, since the brake force is controlled in two stages, that is, a low brake force stage and a medium brake force stage.

It will be appreciated from the foregoing description that the antiskid apparatus in this embodiment exhibits such a marked effect that, on a nonslippery road surface on which the voltage $V_H$ representing the speed of the wheels will not drop as low as the voltage $\beta_2 V_B$ which is a voltage $\beta_2$ times the voltage $V_B$ representing the speed of the vehicle body, the brake force is not rendered zero but a predetermined brake force of such an extent that it will not lock the wheels is left even in the released state of the brake force in order to minimize the variation in the vehicle body deceleration. Such a marked effect can be obtained by virtue of the fact that the antiskid apparatus comprises brake force control device 4 which controls the brake force in three stages, that is, a high brake force stage, a medium brake force stage and a low brake force stage, and which is operable in such a manner that a transition from the high brake force stage to the medium brake force stage takes place when the voltage $V_H$ representing the wheel speed during the braking operation is less than the voltage $\beta_1 V_B$ which is $\beta_1$ times the voltage $V_B$ representing the vehicle body speed, and a transition from the medium brake force stage back to the high brake force stage takes place when the voltage $V_H$ is lower than the voltage $\beta_1 V_B$, while a transition from the medium brake force stage to the low brake force stage takes place when the voltage $V_H$ is lower than the voltage $\beta_2 V_B$ wherein $\beta_2$ is smaller than $\beta_1$, and a transition from the low brake force stage back to the medium brake force stage takes place when the voltage $V_H$ is less than the voltage $\beta_2 V_B$. It is, therefore, possible to shorten the braking distance to stop the vehicle and to give a comfortable feeling of ride during the braking operation. The manner of operation on a nonslippery road surface in which the brake force is not rendered zero but the predetermined brake force is left even in the released state of the brake force, is effective to retard the rate of variation in the rotation of the wheels during the antiskid operation. Therefore, it is not necessary for the brake force control device 4 to have an especially high speed of response and a power source of a small capacity such as the negative pressure of the engine or the battery mounted on the vehicle is sufficient to actuate the brake force control device 4 to satisfactorily control the antiskid operation. Further, on a slippery road surface, the voltage $V_H$ representing the speed of the wheels becomes smaller than the voltage $\beta_2 V_B$ which is $\beta_2$ times the voltage representing the speed of the vehicle body, so that the brake force is shifted from the low brake force stage to the medium brake force stage, whereby the period of intermittent locking of the wheels on such a road surface as a frozen road surface can be shortened markedly. It should be noted in particular that such an effect of the inventive antiskid apparatus can be obtained even under a strong brake force by reducing the brake force to an intermediate degree. The inventive antiskid apparatus also enables such an excellent advantage to be obtained that, since the brake force is released positively to substantially zero independently of the wheel deceleration when the voltage $V_H$ becomes lower than the voltage $\beta_2 V_B$, there is no fear of the wheels being locked continuously.

I claim:

1. An antiskid system for brake assembly of a vehicle body supporting land vehicle wheel of the kind of brake assembly having an hydraulic system including a master cylinder, at least one individual wheel brake cylinder, an hydraulic fluid conduit connecting the master cylinder and individual wheel brake cylinder, and an actuator for variable application of pressure to the master cylinder for effecting braking, said antiskid system comprising:

a brake force controller housing;

pneumatic piston means received in said housing and dividing said housing into a first air chamber and a second air chamber;

connecting rod means secured by one and to said pneumatic piston means;

hydraulic piston means communicated to the hydraulic fluid conduit between the master cylinder and the individual wheel brake cylinder, the opposite end of said connecting rod means being secured to said hydraulic piston means;

resilient means normally biasing the assembly formed by the pneumatic piston means, connecting rod means and hydraulic piston means toward the hydraulic fluid conduit with a predetermined forcefulness in a sense to normally permit the direct correlation of force applied to the actuator and braking force applied at the land vehicle brake and in a sense to diminish the volume of the first air chamber and increase the volume of the second air chamber;

a first solenoid valve of the kind adapted to connect one port thereof with either of two ports thereof;

a second solenoid valve of the kind adapted to connect one port thereof with either of two ports thereof;

conduit means connecting between the one port of said first solenoid valve and said first air chamber;

conduit means connecting between the one port of said second solenoid valve and said second air chamber;

conduit means connecting between a first of the two ports of each of the first and second solenoid valves and the atmosphere;

negative pressure supply conduit means;

conduit means connecting between a second of the two ports of each of the first and second solenoid valves and said negative pressure supply conduit means;

said first solenoid valve when deenergized connecting the first air chamber with the negative pressure supply conduit means;

said first solenoid valve when energized connecting the first air chamber with the atmosphere;

said second solenoid valve when deenergized connecting the second air chamber with the atmosphere;

said second solenoid valve when energized connecting the second air chamber with the negative pressure supply conduit means;

first means for detecting deceleration and acceleration of the vehicle wheel;

second means for detecting deceleration of the vehicle body;

first solenoid valve energization means connected to the first deceleration and acceleration detecting means for receiving detections therefrom, said first solenoid valve means being connected to said first solenoid valve and set to energize said first solenoid valve only when and while deceleration of the vehicle wheel exceeds a first predetermined value; and second solenoid valve energization means connected to the second deceleration detecting means for receiving detections therefrom, said second solenoid valve means being connected to said second solenoid valve and set to energize said second solenoid valve only when and while deceleration of the vehicle body is below a second predetermined value which is closer to zero than is said first predetermined value whereby, when the wheel deceleration is equal to said first predetermined value during braking operation, both said solenoid valves remain deenergized so that atmospheric pressure is introduced into said second air chamber and a negative pressure is introduced into said first air chamber to maintain the hydraulic pressure in said hydraulic fluid conduit at a high level when the wheel deceleration exceeds the first predetermined value and the vehicle body deceleration exceeds said second predetermined value, said first solenoid valve is energized and said second solenoid valve remains deenergized so that an atmospheric pressure is introduced into said first and second air chambers respectively to maintain the hydraulic pressure in said hydraulic fluid conduit at a medium level, and when the wheel deceleration exceeds the first predetermined valve and the vehicle body deceleration is below the second predetermined value, both said first and said second solenoid valves are energized so that a negative pressure is introduced into said second air chamber and atmospheric pressure is introduced into said first air chamber to maintain the hydraulic pressure in said hydraulic fluid conduit at a low level.

2. A vehicle brake antiskid apparatus for incorporation in an hydraulic braking system between a foot-operated brake applying pedal and individual wheel brake cylinders for varying the braking force actually applied at the wheels in relation to functions of vehicle wheel speed and vehicle body speed, said apparatus comprising:

a first solenoid valve alternatively connectible between the atmosphere and a source of negative pressure;

a second solenoid valve alternately connectible between the atmosphere and a source of negative pressure;

means defining a first expansible chamber communicated to the hydraulic braking system in a sense to decrease foot-pedal applied braking pressure only upon expansion of said chamber;

means defining a second expansible chamber communicated to the hydraulic braking system in a sense to decrease foot-pedal applied braking pressure only upon contraction of said chamber;

first means for detecting the speed of at least one vehicle wheel;

second means for detecting the speed of the body of the vehicle; and the first solenoid valve being connected to the first chamber and the second solenoid valve being connected to the second chamber; both said solenoid valves being electrically connected to said first and second detecting means for actuation thereby in such sense that when the wheel speed during braking operation exceeds a level which is $\beta_1$ times the vehicle body speed (where $0<\beta_1<1$), said solenoid valves are both deenergized so that atmospheric pressure is introduced into said second chamber and a negative pressure is introduced into said first chamber (10) to maintain the braking pressure at a high level, when the wheel speed is between said level which is $\beta_1$ times the vehicle body speed and a level which is $\beta_2$ times the vehicle body speed (where $0<\beta_2<\beta_1 1$), said first solenoid valve is energized and said second solenoid valve is deenergized so that a negative pressure is introduced into both said chambers to maintain the braking pressure at a medium level; and when the wheel speed is below a level which is $\beta_2$ times the vehicle body speed, both said solenoid valves are energized so that a negative pressure is introduced into said second chamber and atmospheric pressure is introduced into said first chamber to maintain the braking pressure at a low level.